United States Patent
Appiah et al.

(10) Patent No.: US 7,401,113 B1
(45) Date of Patent: Jul. 15, 2008

(54) PRINTER DRIVER IDENTIFICATION FOR A REMOTE PRINTER

(75) Inventors: Madan Mohan R. Appiah, Redmond, WA (US); Tad Dennis Brockway, Redmond, WA (US); Ritu Bahl, Issaquah, WA (US)

(73) Assignee: Microsoft Corporations, Redmond, WA (US)

( * ) Notice: Subject to any disclaimer, the term of this patent is extended or adjusted under 35 U.S.C. 154(b) by 1091 days.

(21) Appl. No.: 09/454,221

(22) Filed: Dec. 9, 1999

(51) Int. Cl.
 *G06F 15/16* (2006.01)
(52) U.S. Cl. .................. 709/203; 709/222; 719/327
(58) Field of Classification Search ................ 709/205, 709/220, 246, 321, 327, 203, 222; 710/8, 710/10, 11, 104; 713/1; 717/122, 168, 170, 717/171, 172, 173; 719/327
See application file for complete search history.

(56) References Cited

U.S. PATENT DOCUMENTS

| | | | | |
|---|---|---|---|---|
| 5,566,278 A | * | 10/1996 | Patel et al. | |
| 5,580,177 A | * | 12/1996 | Gase et al. | |
| 5,619,716 A | * | 4/1997 | Nonaka et al. | |
| 5,687,301 A | * | 11/1997 | Stokes et al. | ............... 358/1.13 |
| 5,764,992 A | * | 6/1998 | Kullick et al. | |
| 5,802,365 A | * | 9/1998 | Kathail et al. | |
| 5,809,287 A | * | 9/1998 | Stupek, Jr. et al. | |
| 5,867,714 A | * | 2/1999 | Todd et al. | |
| 5,903,753 A | * | 5/1999 | Bramnick et al. | |
| 5,958,049 A | * | 9/1999 | Mealey et al. | ................... 713/1 |
| 5,964,872 A | * | 10/1999 | Turpin | ........................... 713/1 |
| 5,982,996 A | * | 11/1999 | Snyders | |
| 5,982,997 A | * | 11/1999 | Stone et al. | |
| 5,995,723 A | * | 11/1999 | Sperry et al. | |
| 6,003,069 A | * | 12/1999 | Cavill | ........................ 709/205 |
| 6,041,364 A | * | 3/2000 | Lortz et al. | .................... 710/10 |
| 6,073,214 A | * | 6/2000 | Fawcett | |
| 6,074,434 A | * | 6/2000 | Cole et al. | |
| 6,119,157 A | * | 9/2000 | Traversat et al. | ............ 709/220 |
| 6,138,178 A | * | 10/2000 | Watanabe | ....................... 710/8 |
| 6,141,028 A | * | 10/2000 | Aruga | |
| 6,201,611 B1 | * | 3/2001 | Carter et al. | ................ 358/1.15 |
| 6,202,070 B1 | * | 3/2001 | Nguyen | |
| 6,202,207 B1 | * | 3/2001 | Donohue | |
| 6,263,378 B1 | * | 7/2001 | Rudoff et al. | ................ 709/327 |
| 6,263,497 B1 | * | 7/2001 | Maeda et al. | |
| 6,269,481 B1 | * | 7/2001 | Perlman et al. | ............. 717/178 |
| 6,301,012 B1 | * | 10/2001 | White et al. | ................ 358/1.15 |
| 6,321,258 B1 | * | 11/2001 | Stollfus et al. | ............... 709/220 |
| 6,351,751 B1 | * | 2/2002 | Traversat et al. | ............ 709/220 |
| 6,353,928 B1 | * | 3/2002 | Altberg et al. | .............. 709/327 |
| 6,385,668 B1 | * | 5/2002 | Gaddess et al. | ................. 710/8 |
| 6,408,434 B1 | * | 6/2002 | Fujiwara | ...................... 717/170 |
| 6,418,555 B2 | * | 7/2002 | Mohammed | ................. 709/317 |
| 6,473,899 B1 | * | 10/2002 | Nelson et al. | |
| 6,513,159 B1 | * | 1/2003 | Dodson | |

(Continued)

*Primary Examiner*—Andrew Caldwell
*Assistant Examiner*—Oleg Survillo
(74) *Attorney, Agent, or Firm*—Lee & Hayes, PLLC

(57) ABSTRACT

In a multi-user server-client environment, a printer can be attached to a client computer. The server selects a corresponding printer driver to install on the server in order to allow applications executing on the server to print to the printer attached to the remote client computer. The selection process allows the server to intelligently identify closely matching printer drivers in the event that a particular printer driver that the server is notified of is not available for installation.

40 Claims, 4 Drawing Sheets

U.S. PATENT DOCUMENTS

| | | | |
|---|---|---|---|
| 6,538,763 B1 * | 3/2003 | Klosterman et al. | 358/1.15 |
| 6,567,175 B1 * | 5/2003 | Lee | 358/1.14 |
| 6,581,094 B1 * | 6/2003 | Gao | 709/220 |
| 6,606,669 B1 * | 8/2003 | Nakagiri | 719/327 |
| 6,607,314 B1 * | 8/2003 | McCannon et al. | 400/62 |
| 6,671,749 B2 * | 12/2003 | Williams et al. | 710/10 |
| 6,681,392 B1 * | 1/2004 | Henry et al. | 717/176 |
| 6,757,071 B1 * | 6/2004 | Goodman et al. | 358/1.13 |
| 6,772,420 B1 * | 8/2004 | Poger et al. | 719/327 |
| 6,789,111 B1 * | 9/2004 | Brockway et al. | 709/222 |
| 6,804,019 B2 * | 10/2004 | Shiohara | 358/1.15 |
| 6,814,510 B1 * | 11/2004 | Sabbagh et al. | 400/63 |
| 2002/0035941 A1 * | 3/2002 | Nakao | |
| 2002/0067504 A1 * | 6/2002 | Salgado et al. | |
| 2002/0075344 A1 * | 6/2002 | Usui et al. | |
| 2002/0078160 A1 * | 6/2002 | Kemp et al. | |
| 2002/0078183 A1 * | 6/2002 | Helms | 709/220 |

* cited by examiner

PRINTER DRIVER IDENTIFICATION FOR A REMOTE PRINTER

TECHNICAL FIELD

This invention relates to server-client systems and, in particular, to a server-client system in which a proper printer driver for a printer attached to the client is identified.

BACKGROUND OF THE INVENTION

In a typical server-client system, a server computer is connected to several client computers or terminals via a network. In such a system, applications are executed at the server rather than at the client. The server transmits display information to the client for display at the client, and user inputs (e.g., via keyboard or mouse) at the client are transmitted to the server for processing by an application(s) executing at the server. The "client" may be an entire client computer, or alternatively an application executing at the client computer.

A server in such a system typically has an operating system that can run several client sessions concurrently. Each client user has access to various resources of the server, including the processor, data storage, application programs, etc. Software applications that are resident on the server are available to each client for independent execution by the client. Each session is independent from the other sessions and, therefore, one client cannot access information relating to another client. In this manner, the server provides a logically independent machine for each client connected to the server.

Client users frequently use peripheral devices physically attached to the client machines. For example, a user may wish to attach a printer to the user's client computer (a "local" printer) in order to print data generated by an application that is running on the server computer. To do this, currently the user must manually install the local printer and redirect the printer queue created by the server to the I/O port of the client computer to which the printer is connected. Such manual installation of peripheral devices is undesirable because it requires significant time and effort on the part of the user. U.S. Pat. No. 6,789,111 entitled "Automatic Detection And Installation Of Client Peripheral Devices By A Server", describes a system which resolves many of these manual installation problems by automatically detecting such devices and installing and corresponding device drivers at the server.

However, one problem that can be encountered with either manual identification or automatic detection of peripheral devices is the identification of the proper driver to be installed. In order to properly install a peripheral device, the correct driver needs to be installed at the server. Typically, the client notifies the server of the correct driver to use for a particular device. However, situations can arise where the driver that the client indicates should be used for a particular peripheral device is not available at the server, thereby preventing installation of that particular device.

The invention described below addresses these disadvantages, providing for printer driver identification for a remote printer.

SUMMARY OF THE INVENTION

In a server-client environment, a peripheral device can be attached to a client computer. The server selects a corresponding printer driver to install on the server to allow applications executing on the server to print to the printer attached to the remote client computer. For purposes of discussion, reference herein is made primarily to printers. However, the driver selection described herein can be analogously applied to any of a variety of peripheral devices, such as scanners, card readers, zip drives, etc.

An embodiment of the server selects a printer driver to install at the server for use with the printer attached to the remote client computer using an "exact match" technique. In this embodiment, the server receives a printer driver identifier and checks whether any of a plurality of printer drivers maintained at the server has a corresponding identifier that matches the received printer driver identifier. If such a match is found, then the matching printer driver from the plurality of printer drivers is installed on the server.

Another embodiment of the server selects a printer driver to install at the server for use with the printer attached to the remote client computer using a "driver name mapping" technique. In this embodiment, the server receives a printer driver identifier and checks whether any of a plurality of printer drivers maintained at the server has a corresponding identifier that is different than the received printer driver identifier but that corresponds to the same printer driver as the received printer driver identifier. Such differences can occur, for example, when a manufacturer or distributor of a printer driver changes the name of the printer driver. If such a match is found, then the matching printer driver from the plurality of printer drivers is installed on the server.

Another embodiment of the server selects a printer driver to install at the server for use with the printer attached to the remote client computer using a "close match" technique. In this embodiment, the server receives a printer driver identifier and checks whether any of a plurality of printer drivers maintained at the server has a corresponding driver name that is the same as a driver name received as part of the printer driver identifier. If such a match is found, then the matching printer driver from the plurality of printer drivers is installed on the server without regard for whether that particular printer driver has a corresponding driver version that is the same as a driver version received as part of the printer driver identifier.

Another embodiment of the server issues a notification when a printer driver is installed that is not an exact match to a received printer driver identifier. Such an "inexact" match could be due to a change in driver name, installation of a previous version of a requested printer driver, installation of a more recent version of a requested printer driver, etc. The notification can be used, for example, to make a system administrator or the user of the client computer aware that the inexact match occurred.

Another embodiment of the server attempts to automatically update a printer driver under certain circumstances. In this embodiment, if a received printer driver identifier indicates a more recent version of a printer than is available on the server, the server attempts to locate the more recent version and add it to the server so that the most recent version can be installed on the server.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
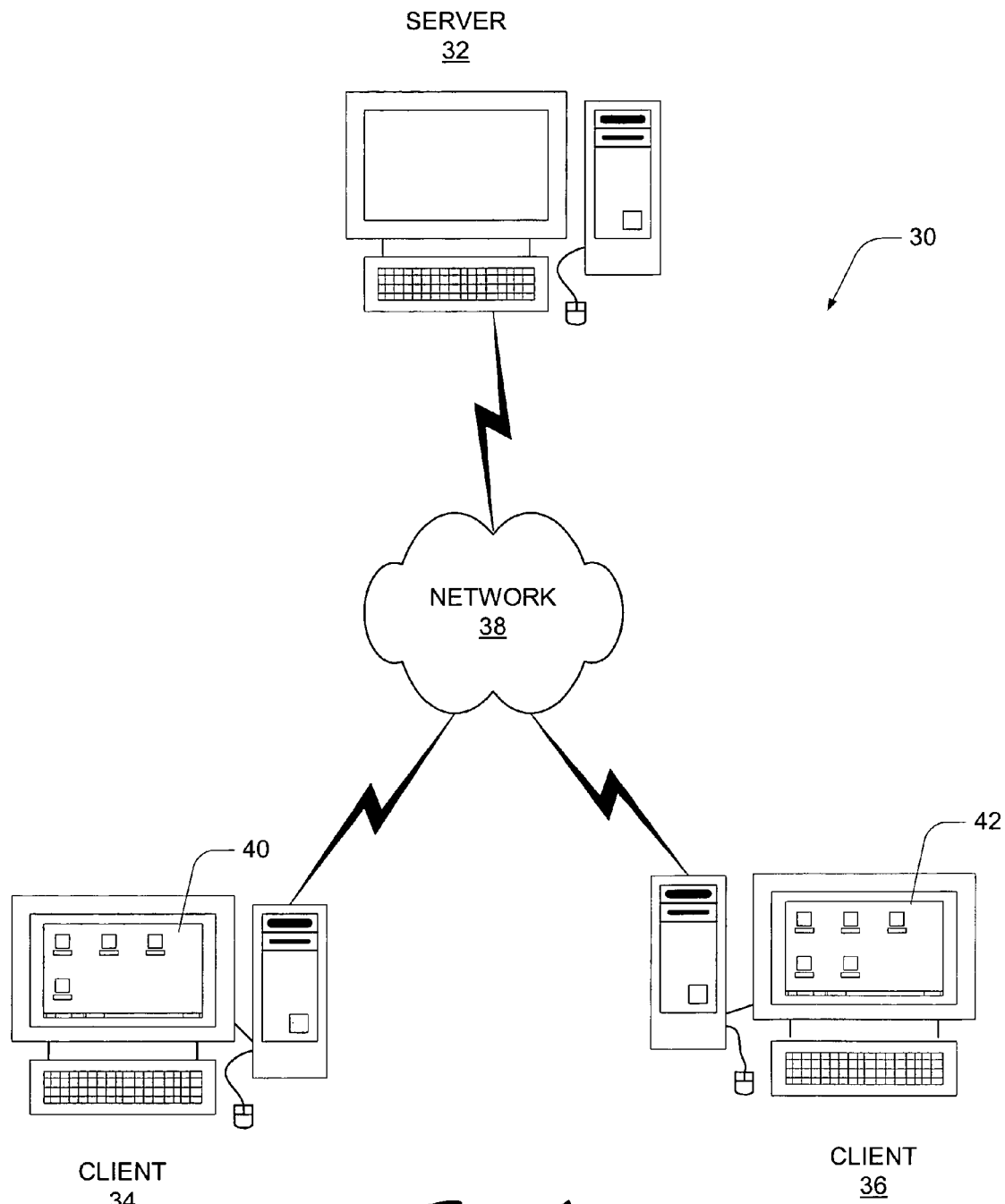
FIG. 1 is a diagrammatic illustration of a server/client system.

FIG. 1 shows a server/client computer system 30 having a server 32, a first client 34 and a second client 36 interconnected via a network 38. The server 32 and the clients 34, 36 have modems or network cards, which facilitate access (direct or otherwise) to the network 38 so that the server 32 and the clients 34, 36 can exchange information over the network 38. The clients 34, 26 each have a desktop 40, 42 interface displayed.

The server 32 is a computer. A client 34, 36 may be a computer having Plug and Play capability, a computer that is not Plug and Play compatible, or a terminal, which does not have the processing capability of a computer. Implications of utilizing the different types of clients will be discussed in greater detail below.

It is noted that, although the server/client computer system 30 depicted in FIG. 1 has a first client 34 and a second client 36, there may be one to any number of clients connected to the server 32 concurrently. The number of clients that may be connected to a server is limited only by the architecture of a particular server.

The server 32 is configured to provide a logically independent machine for each client 34, 36 connected to the network 38. That is, the server 32 establishes a session for each client 34, 36, provides the desktop 40, 42 for each client 34, 36, and makes server resources available to the clients 34, 36. Such resources include, but are not limited to, allocations of processor time, memory, data storage, video processing, application programs, etc. A user of either of the clients 34, 36 interacts with the desktop 40, 42 on the client 34, 36 to run software applications that reside on the server 32. While the user provides input to and receives output from the client 34, 36, most processing is performed at the server 32.

The network 38 provides a communications link between the server 32 and the clients 34, 36 through which data is transmitted. The network 38 may be a local area network (LAN), a wide area network (WAN), the Internet, or the like, provided that it can accommodate server/client functionality.

Figure 2:
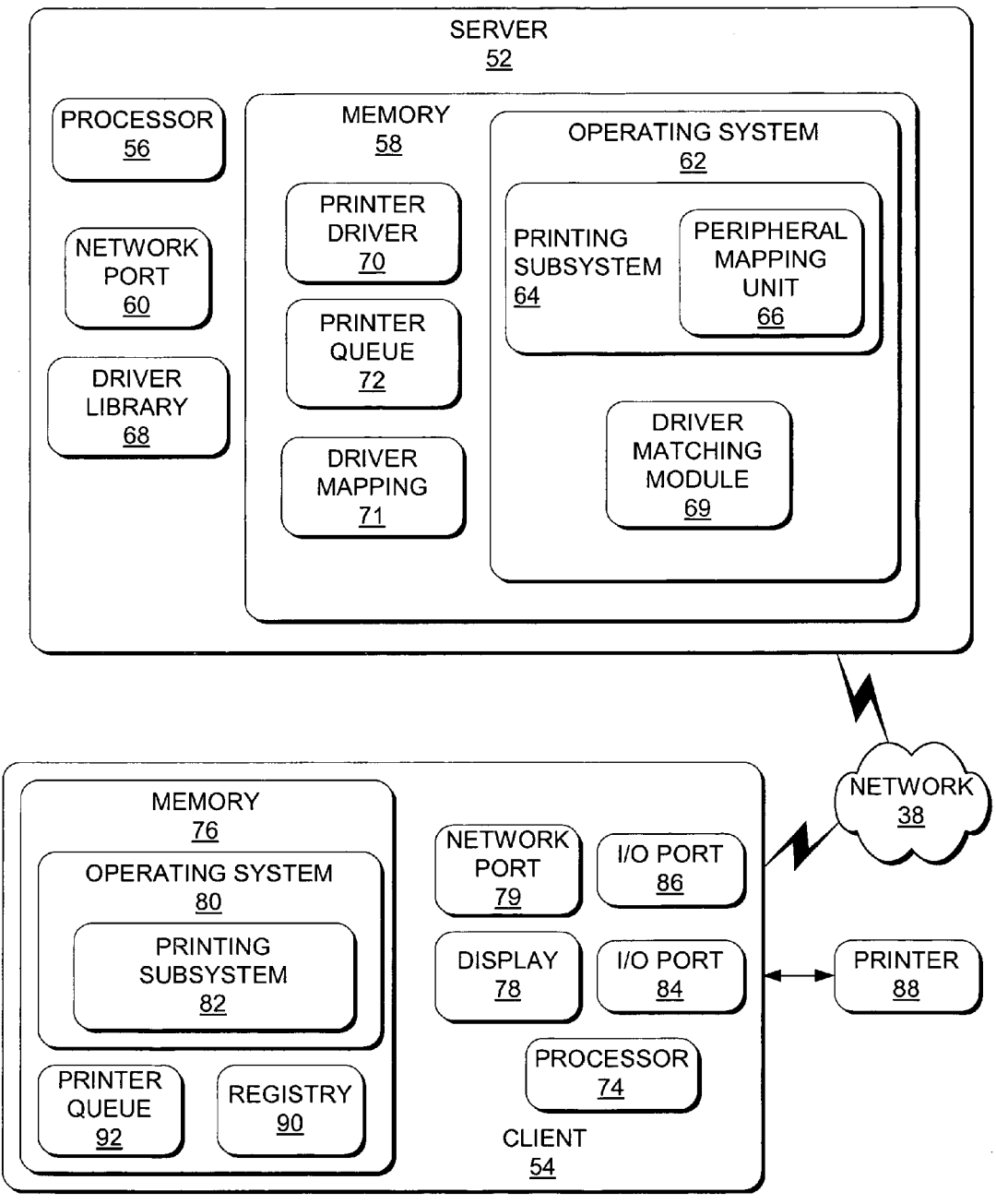
FIG. 2 is a block diagram illustrating a server/client system in more detail.

FIG. 2 shows a server/client system 50 having a server 52 and a client 54. The server 52 includes a processor 56 and memory 58. The server 52 also has a network port 60, which facilitates access to the network 38. The network port 60 may be implemented as a modem, network card, or other device, which interfaces the server 52 to the network 38.

The server 52 can be implemented as a common personal computer or other type of computer, such as a laptop computer, etc. The server 52 runs an operating system 62, which is stored in memory 58 and executes on the processor 56. The operating system 62 is a multitasking operating system such as a Windows® brand operating system from Microsoft Corporation (e.g., Windows® 98, Windows® 95, Windows® NT, or other derivative of Windows®). However, other multitasking operating systems may be used.

The server 52 has a printing subsystem 64 implemented in the operating system 62 stored in memory 58. The printing subsystem 64 is used to direct all operations involving printers and printing, including installing printers, creating and managing printer queues, removing printers, uninstalling printers, etc. The printing subsystem includes a peripheral mapping unit 66 that is configured to map, or redirect, printer queues to printer ports. The printing subsystem 64 may be an integral part of the operating system 62 or it may be a software function that is callable by the operating system 62 or by application programs.

The server 52 is shown having a printer driver 70 and a printer queue 72 installed and resident within the memory 58. It is noted, however, that the server 52 will only include the printer driver 70 and the printer queue 72 when a printer has been connected to the system 50 and installed on the server 52. The printer driver 70 is a printer-specific software program that provides an interface between a printer and the server 52 and allows the server 52 to provide print functions via the printer. When the printer driver 70 is installed on the server 52, the printer queue 72 is created. The printer queue 72 accepts print jobs from the server 52 and queues them for printing.

The server 52 further includes a driver library 68, which is a set of multiple peripheral device drivers that are available for installation on the server 52 (e.g., as the printer driver 70). In the illustrated example, the driver library 68 is maintained at the server 52. Alternatively, the driver library may be maintained at some other location (e.g., a remote location accessible via the network 38) that is accessible to the server 52. When a driver is installed on the server 52 for a device attached to the client 54, the driver is obtained from driver library 68.

The operating system 62 further includes a driver matching module 69. When a driver is to be installed on the server 52, the server 52 receives an indication (e.g., automatically detected by the client 54 or manually input by a user) of the driver that is to be installed. However, situations can arise when the received indication identifies a driver that is not available to the server 52 (e.g., is not in the driver library 68) and thus is not available for installation at the server 52. The driver matching module 69 remedies such situations by attempting to select, for installation at the server 52, a driver that most closely matches the driver identified in the received indication.

The server 52 further includes a driver mapping 71. The driver mapping 71 is a record (e.g., a list) of old driver names and new driver names. Situations can arise where the name of a driver is changed. Such changes are maintained by the server 52 in order to install the appropriate driver in the event that the driver is identified by its old name, as discussed in more detail below.

The client 54 includes memory 76 and a display 78. Similar to the server 52, the client 54 also has a network port 79 to facilitate access to the network 38. The network port 79 may be implemented as a modem, network card, or other device, which interfaces the client 54 to the network 38. The client 54 also includes a printing subsystem 82 resident in the memory 76, a first I/O port 84, a second I/O port 86, and a printer 88 connected to the first I/O port 84. The printing subsystem supports the concept of printing queues, which are logical containers that encompass a physical printer's driver information, properties, and pending print jobs.

The client 54 has a system registry 90 located in the memory 76. The printing subsystem 82 may be an integral part of the operating system 80 or it may be a software function that is callable by the operating system 80 or by application programs. The server/client system 50 also includes the printer 88, which is connected to the first I/O port 84. A printer queue 92 is installed in the memory 76 for the printer 88.

It is noted that, although the client 54 is depicted as being a computer, the client 54 may also be a terminal, which does not have the mass storage or processing capabilities of a computer. The present invention functions similarly whether the client 54 is a computer or a terminal.

The client 54 may automatically detect the printer 88, or the printer 88 may be manually identified to the client 54 and/or the server 52. For example, a user may manually notify the server 52 or the client 54 of the location of the printer 88 and an I/O port of the client 54 to which the printer 88 is attached (e.g., by use of a printer setup "wizard").

When the printer 88 is attached to the client 54, information identifying a A corresponding printer driver to use for the printer 88 is provided to the server 52. This information can be automatically detected by the client 54 or alternatively can be supplied manually by the user of the client 54. Additionally, the information can be provided when the user of the client 54 logs on to the server 52, or alternatively at some subsequent time. Regardless of the source of the printer driver information or when the information is provided, this received printer driver information is used by the server 52 in selecting an appropriate printer driver from the driver library 68 to install on the server 52 in order to allow applications executing on the server 52 to print to the printer 88.

Figure 3:
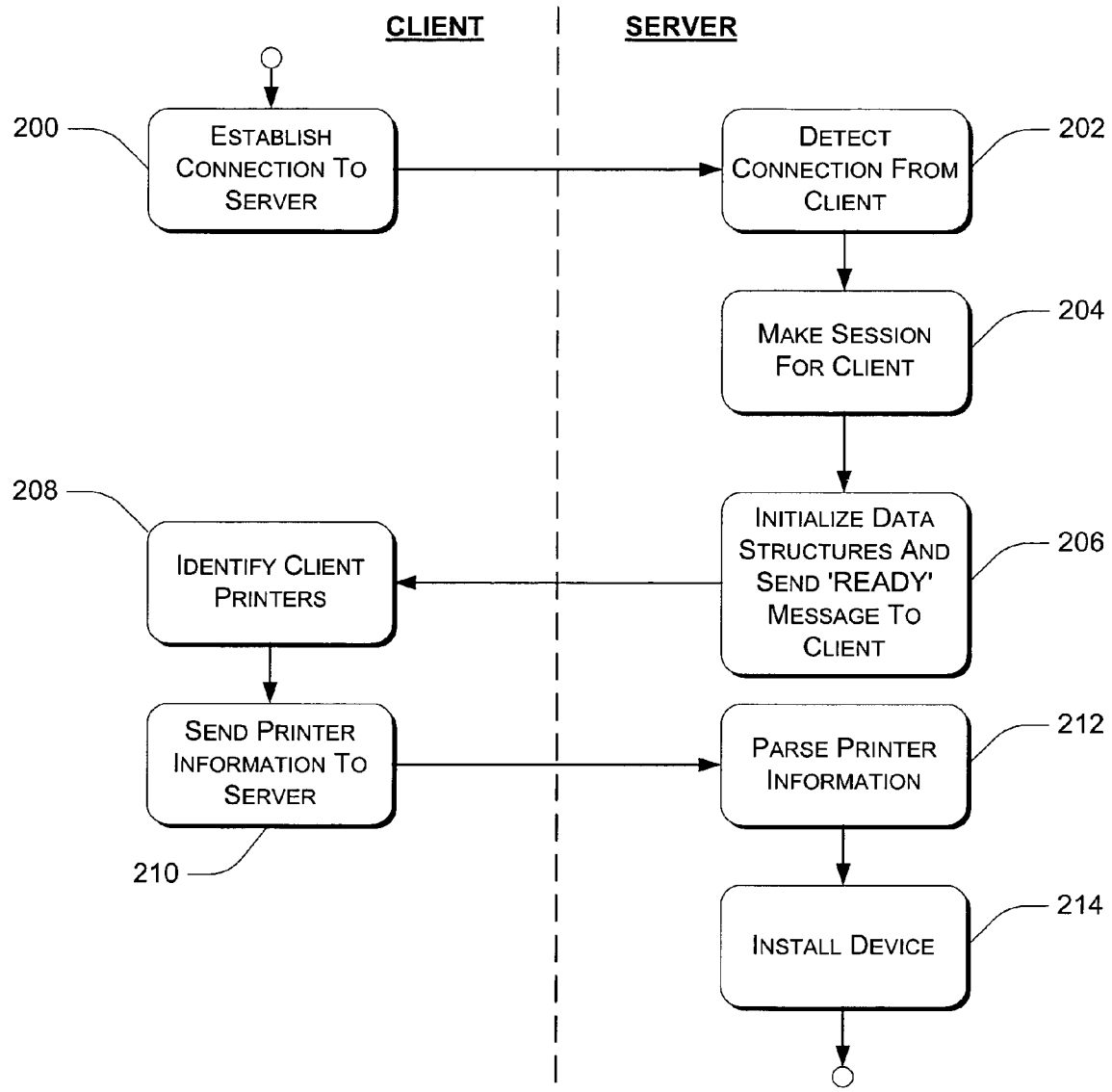
FIG. 3 is a flow diagram depicting an exemplary process for installing peripheral devices at a server that are attached to a client.

FIG. 3 is a flow diagram depicting an exemplary process for installing peripheral devices at a server that are attached to a client. The method is described with continuing reference to FIGS. 1 and 2.

At step 200 in FIG. 3, the client 54 establishes a connection with the server 52. After the client 54 establishes the connection, the client 54 waits for an announcement package from the server 52. When the server 52 detects the connection from the client 54 (step 202), the server 52 sets up a session for the client 54 at step 204. At step 206, the server 52 initializes the data structures necessary to provide the session for the client 54. When this is completed, the server 52 sends an announcement package to the client 54, which signals the client 54 that it can commence interactive communications with the server 52.

At step 208, the printer(s) attached to the client 54 are identified. As previously discussed, the client 54 is a computer having a printing subsystem. The printing subsystem provides an interface, such as an Application Programming Interface (API) that allows applications (such as operating system 80 or another application separate from operating system 80) to identify printer queues installed at the client 54 (e.g., the printer 88). Such queues can be installed at client 54 in any of a variety of manners, such as automatically (e.g., using a Plug and Play (PnP) subsystem), or manually. At step 210, information describing these identified queues, such as a particular driver name and version or a PnP identifier, is sent to the server 52.

At step 214, the server 52 installs the identified printer(s). The printing subsystem 64 on the server 52 parses the information to determine the printer driver corresponding to the printer 88 that should be installed on the server 52. This identified printer driver is then used to determine which printer driver from library 68 to install as printer driver 70, as discussed in more detail below. The printer driver 70 is installed on the server 52 and the printer queue 72 is created. The peripheral mapping unit 66 then redirects the printer queue 72 to the I/O port 84 to which the printer 88 is connected.

Figure 4:
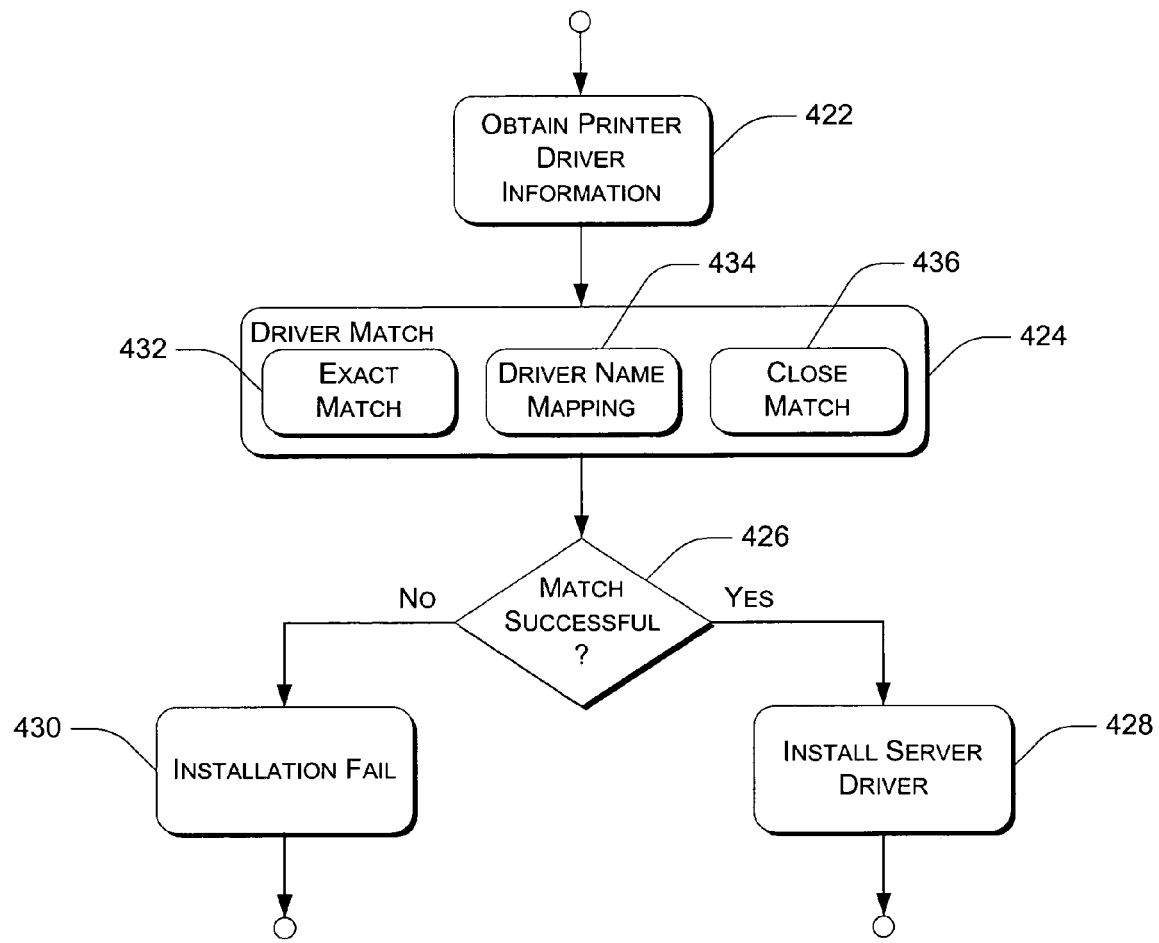
FIG. 4 is a flow diagram of an exemplary process for installing an appropriate printer driver in accordance with one embodiment of the invention.

FIG. 4 is a flow diagram illustrating an exemplary process for installing an appropriate printer driver in accordance with one embodiment of the invention. FIG. 4 is described with additional reference to components in FIG. 2.

Initially, the server 52 obtains the printer driver information (step 422), which identifies a printer driver that is expected to be installed on the server 52 for use with the printer 88. This "expected driver" can be determined in various manners. For example, the user of the client 54 may indicate a particular printer driver to use, or alternatively a PnP subsystem on the client 54 may indicate that a particular printer driver is to be used (e.g., by driver name and version number, by a PnP identifier that can be resolved by server 52 into a driver name and version (e.g., via a lookup table), etc.). The printer driver information includes both a printer driver name and a printer driver version. Typically the printer driver information for one printer will identify a single printer driver, although alternatively multiple printer drivers (including multiple names and multiple versions) may be identified in the printer driver information.

Situations can arise where the identified printer driver is not available on the server 52. Such situations can arise for a variety of different reasons. For example, the name of the printer driver (and/or the version of the printer driver) may have been changed by the manufacturer (or developer, distributor, etc.) of the driver, so that the identified printer driver name no longer exists. By way of another example, the version of the identified printer driver may be a new or older version of the printer driver than is available on the server 52.

Thus, the server 52 attempts to match the received printer driver information to a particular printer driver available to the server 52 (step 424). The server 52 then takes different actions depending on whether the attempt to match the received printer driver information to a particular printer driver is successful (step 426). If the attempt to match is successful, then the matching printer driver is installed at the server (step 428). However, if the attempt to match is unsuccessful, then the driver installation process fails (step 430).

The server 52 uses various techniques to attempt to match the received printer driver information to a particular printer driver. In the illustrated example, three such techniques are used, referred to as "exact match" (step 432), "driver name mapping" (step 434), and "close match" (step 436). Each of these techniques involves comparing at least a portion of the received printer driver information to information corresponding to the printer drivers available to the server 52. Such comparisons can be done by accessing each of the printer drivers individually, by accessing a record of the printer driver information for each of the available printer drivers (having identifiers or links to the corresponding printer driver(s)), or by a combination thereof.

The server 52 may follow a particular ordering in using these techniques, such as using the exact match technique first, followed by the driver name mapping and close match techniques if necessary. Alternatively, two or more of these techniques could be used concurrently.

In the exact match technique (step 432), the driver matching module 69 searches for an exact match between the received printer driver information and the information corresponding to the printer drivers available to the server 52. An exact match between the received printer driver information and a particular printer driver available to the server 52 refers to the printer driver names being the same and the printer driver versions being the same.

In the driver name mapping technique (step 434), the driver matching module 69 searches for a change in driver name. Situations can arise where the name of a particular driver is changed. The server 52 maintains a record (e.g., driver mapping 71) of changes to driver names. This record includes the previous name(s) for printer drivers as well as their new names. If a received driver name is included in this record as a previous name, then the server 52 searches the available printer drivers for the new name identified from this record.

For example, assume that at the time the printer 88 is initially attached to the client 54 the correct name for the printer driver for the printer 88 is "driverY", and this information is recorded at the client 54. Subsequently, the manufacturer of the printer 88 changes its naming convention, so that the correct name for the printer driver for the printer 88 is changed to "X printer driver". Further assume that the server 52 is distributed after the naming convention change occurs, so the server 52 has available to it the printer driver with the name "X printer driver" but does not have "driverY" available to it. In this situation, a record of the change in printer driver name is maintained by the server 52 (e.g., the manufacturer making the change in naming convention notifies a system administrator of the change in naming convention or the old and new driver names for the printer drivers affected by the naming convention change). Thus, if the client 54 subsequently identifies to the server 52 "driverY" in its printer driver information, the server 52 knows that "X printer driver" is the matching printer driver to be installed.

The driver name mapping technique can be used as an additional technique in the event the exact match technique (and/or the close match technique) fails. Alternatively, the driver name mapping technique may be used prior to either the exact match technique or the close match technique, with the new driver name resulting from application of the driver name mapping technique being used as the received driver name (and possible driver version) during application of the exact match and close match techniques.

In the close match technique (step 436), the driver matching module 69 searches for an available printer driver with the same name as the received printer driver but a different driver version. Situations can arise where one of the server 52 and the client 54 is aware of a more recent version of the printer driver than the other is aware of. In such situations, as long as the printer driver name matches, the server 52 will select the version of the printer driver it has available to it for installation. This selection by the server 52 occurs regardless of whether the version identified by the client 54 is a newer version or an older version than the version available to the server 52.

For example, the client 54 may be aware of version 2.1 of "driverZ" and identify to the server 52, as the printer driver information for a particular printer, version 2.1 of "driverZ". However, the server 52 may only have version 2.0 of "driverZ" and not yet have version 2.1 available to it. In this situation, the server 52 selects version 2.0 of "driverZ" for installation. By way of another example, the client 54 may be aware of version 3.10 of "driverA" and identify to the server 52, as the printer driver information for a particular printer, version 3.10 of "driverA". However, the server 52 may have a newer version of "driverA" available to it, version 3.11. In this situation, the server 52 selects version 3.11 of "driverA" for installation.

Alternatively, the driver name mapping technique (step 434) and the close match technique (step 436) can be combined into a single step. The record maintained by server 52 of changes to driver names (e.g., driver mapping 71) can also include mappings of "requested driver to available driver" for all clients or alternatively on a per-client basis. For example, server 52 may maintain a record that when a request is made for version 3.10 of "driverA", that the driver to be installed is version 3.11 of "driverA". Such mapping information can be identified for storage at server 52 in a variety of manners, such as manual identification by a system administrator, automatic detection the first time it arises (e.g., close match technique step 436), etc.

The server 52 may also optionally take additional actions depending on which of the various mapping techniques were used in obtaining a printer driver match. One such action is to issue a notification in the event that anything other than the exact match technique was used in selecting the printer driver for installation. The notification could simply be a warning that a technique other than exact match was used, or alternatively may include additional information describing the matching process or results, such as what technique(s) was used, what driver was selected as the matching driver, what printer driver information was received, etc. Such notifications can be made in any of a wide variety of forms, such as: sending an electronic mail message to the user of the client 54 or a system administrator; displaying a dialog box on either the client 54 or the server 52; sounding an audible "alarm" at the server 52; adding an entry to a notification log; placing a telephone call (e.g., to a phone or pager); etc.

Another action that may be taken is to automatically attempt to add a new driver to the drivers available to the server 52. For example, if the received printer driver information identifies a newer version of a particular driver that is not available to the server 52, the server 52 can automatically attempt to obtain that new driver. The new driver can be obtained in any of a variety of manners, such as accessing a remote server computer for the distributor (or manufacturer, etc.) of the printer driver via the Internet, via a direct-dial connection, etc. The server 52 can be programmed with information identifying how to connect to such a remote server (e.g., including a telephone number, uniform resource locator (URL), etc.). Once the new driver is obtained, it could be installed at the server 52 immediately, or alternatively could be used the next time the client 54 logs on to the server 52 (so that subsequent matching attempts would result in an exact match).

CONCLUSION

In a server-client environment as described herein a printer can be attached to a client computer and made available for printing to by applications executing on the server computer. The server receives information identifying a printer driver to be used for the printer and attempts to identify a closest matching printer driver to be installed at the server.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method in a server-client environment, the method comprising:
   receiving at the server a driver identifier for a printer that is attached to the client;
   using the driver identifier to select a closest matching driver of a plurality of drivers to install at the server; and
   installing, at the server and not at the client, the selected driver in order to enable applications executing on the server to print to the printer using the installed driver.

2. A method as recited in claim 1, wherein the receiving comprises receiving the driver identifier from the client.

3. A method as recited in claim 1, wherein the driver identifier includes both a driver name and a driver version.

4. A method as recited in claim 1, wherein the using comprises accessing a library at the server that stores the plurality of drivers.

5. A method as recited in claim 1, wherein:
the using comprises checking whether any of the plurality of drivers has a corresponding driver identifier that is the same as the received driver identifier; and
if a particular driver of the plurality of drivers has a corresponding driver identifier that is the same as the received driver identifier, then selecting that driver to install at the server.

6. A method as recited in claim 1, wherein:
the using comprises checking whether any of the plurality of drivers currently has a corresponding driver identifier that is different than the received driver identifier but that corresponds to the same driver as the received driver identifier; and
if a particular driver of the plurality of drivers currently has a corresponding driver identifier that is different than the received driver identifier but that corresponds to the same driver as the received driver identifier, then selecting that driver to install at the server.

7. A method as recited in claim 6, wherein one of the plurality of drivers currently has a corresponding driver identifier that is different than the received driver identifier but that corresponds to the same driver because of a driver name change by a source of the driver.

8. A method as recited in claim 6, further comprising:
issuing a notification that the selected driver currently has a corresponding driver identifier that is different than the received driver identifier but that corresponds to the same driver as the received driver identifier.

9. A method as recited in claim 1, wherein:
the receiving comprises receiving a driver name and a driver version;
the using comprises checking whether any of the plurality of drivers has a corresponding driver name that is the same as the received driver name; and
if a particular driver of the plurality of drivers has a corresponding driver name that is the same as the received driver name, then selecting that driver to install at the server.

10. A method as recited in claim 9, further comprising:
selecting a first driver with a corresponding driver name that is the same as the received driver name to install at the server without regard for whether the received driver version is the same as a corresponding driver version of the first driver.

11. A method as recited in claim 9, further comprising:
issuing a notification that the selected driver has a corresponding driver name that is the same as the received driver name but a corresponding driver version that is different than the received driver version.

12. A method as recited in claim 9, further comprising:
checking whether the selected driver has a corresponding driver version that is the same as the received driver version; and
if the selected driver does not have a corresponding driver version that is the same as the received driver version, then obtaining a new copy of the driver that has the same driver version as the received driver version.

13. A method as recited in claim 12, further comprising:
obtaining a new copy of the driver only if the received driver version indicates a more recent version of the driver than is indicated by the driver version corresponding to the selected driver.

14. At least one computer-readable memory containing a computer program that is executable by a processor to perform the method recited in claim 1.

15. A method implemented in a server in a server-client environment, the method comprising:
automatically selecting at least one of a plurality of drivers corresponding to a peripheral device attached to the client; and
installing, at the server and not at the client, the selected at least one driver wherein the server can interface with the peripheral device using the driver to cause the selected at least one driver to perform an action at the peripheral device using the driver.

16. A method as recited in claim 15, wherein the peripheral device comprises a printer.

17. A method as recited in claim 15, wherein the automatically selecting comprises using a received driver identifier corresponding to a printer to select a closest matching driver of the plurality of drivers to install at the server.

18. A method as recited in claim 15, wherein:
the automatically selecting comprises checking whether any of the plurality of drivers has a corresponding driver identifier that is the same as a received driver identifier; and
if a particular driver of the plurality of drivers has a corresponding driver identifier that is the same as the received driver identifier, then installing that driver at the server.

19. A method as recited in claim 15, wherein:
the automatically selecting comprises checking whether any of the plurality of drivers currently has a corresponding driver identifier that is different than a received driver identifier but that corresponds to the same driver as the received driver identifier; and
if a particular driver of the plurality of drivers currently has a corresponding driver identifier that is different than the received driver identifier but that corresponds to the same driver as the received driver identifier, then installing that driver at the server.

20. A method as recited in claim 19, further comprising:
issuing a notification that the installed driver currently has a corresponding driver identifier that is different than the received driver identifier but that corresponds to the same driver as the received driver identifier.

21. A method as recited in claim 15, wherein:
the automatically selecting comprises checking whether any of the plurality of drivers has a corresponding driver name that is the same as a received driver name; and
if a particular driver of the plurality of drivers has a corresponding driver name that is the same as the received driver name, then installing that driver at the server.

22. A method as recited in claim 21, further comprising:
selecting a first driver with a corresponding driver name that is the same as the received driver name to install at the server without regard for whether a received driver version is the same as a corresponding driver version of the first driver.

23. A method as recited in claim 21, further comprising:
issuing a notification that the installed driver has a corresponding driver name that is the same as the received driver name but a corresponding driver version that is different than the received driver version.

24. A method as recited in claim 21, further comprising:
checking whether the installed driver has a corresponding driver version that is the same as a received driver version; and
if the selected driver does not have a corresponding driver version that is the same as the received driver version, then obtaining a new copy of the driver that has the same driver version as the received driver version.

25. The method of claim 15, wherein at least one computer-readable memory contains a computer program that is executable by a processor to perform the method.

26. One or more computer-readable media having stored thereon a computer program that, when executed by one or more processors of a server in a client-server system, causes the one or more processors to:

receive a printer driver identifier for a printer attached to a client;

use the printer driver identifier to select one of a plurality of printer drivers to install at the server and not at the client according to the following:

if a particular printer driver of the plurality of printer drivers has a corresponding printer driver identifier that is the same as the received printer driver identifier, then selecting that particular driver, if a particular printer driver of the plurality of printer drivers currently has a corresponding printer driver identifier that is different than the received printer driver identifier but that corresponds to the same printer driver as the received printer driver identifier, then selecting that particular printer driver, and if a particular printer driver of the plurality of printer drivers has a corresponding driver name that is the same as a driver name received as part of the printer driver identifier, then selecting that particular printer driver without regard for whether that particular printer driver has a corresponding driver version that is the same as a driver version received as part of the printer driver identifier; and install the selected printer driver at the server in order to enable the selected printer to print.

27. The computer-readable media of claim 26, wherein the server comprises a terminal server and wherein the client comprises a terminal server client.

28. The computer-readable media of claim 26, wherein one of the plurality of printer drivers currently has a corresponding printer driver identifier that is different than the received printer driver identifier but that corresponds to the same printer driver due to a name of the printer driver being changed.

29. An apparatus comprising:

a driver library including a plurality of printer drivers; and a driver matching module to select at least one of the plurality of printer drivers to be installed on the apparatus to enable a printer attached to a client connected with the apparatus to print, wherein the driver is installed on the apparatus and not the client.

30. An apparatus as recited in claim 29, wherein the driver matching module further:

checks whether any of the plurality of drivers has a corresponding driver identifier that is the same as a received driver identifier; and wherein if a particular driver of the plurality of drivers has a corresponding driver identifier that is the same as the received driver identifier, then install that driver on the apparatus.

31. An apparatus as recited in claim 29, further comprising:

a mapping table to map previous driver identifiers to subsequent driver identifiers;

wherein the driver matching module further checks the mapping table to determine whether any of the plurality of drivers currently has a corresponding driver identifier that is different than a received driver identifier but that corresponds to a same printer driver as the received printer driver identifier; and if so, then installs the corresponding printer driver on the apparatus.

32. An apparatus as recited in claim 29, wherein the driver matching module further:

checks whether any of the plurality of printer drivers has a corresponding driver name that is the same as a received driver name; and wherein if a particular printer driver of the plurality of printer drivers has a corresponding driver name that is the same as the received driver name, then install that printer driver on the apparatus without regard for whether that particular printer driver has a corresponding driver version that is the same as a received driver version.

33. A system comprising:

a client computer having a local printer attached thereto; and a server computer coupled to the client computer via a network, wherein the server computer includes:

a driver library including a plurality of printer drivers, and a driver matching module to select at least one of the plurality of printer drivers for installation on the server computer and not the client computer to allow applications executing on the server computer to print to the local printer, the driver matching module selecting one of the plurality of printer drivers for installation based on a printer driver identifier and according to the following:

if a particular printer driver of the plurality of printer drivers has a corresponding printer driver identifier that is the same as the received printer driver identifier, then selecting that particular driver for installation in order to enable the local printer to print, if a particular printer driver of the plurality of printer drivers currently has a corresponding printer driver identifier that is different than the received printer driver identifier but that corresponds to the same printer driver as the received printer driver identifier, then selecting that particular printer driver for installation in order to enable the local printer to print, and if a particular printer driver of the plurality of printer drivers has a corresponding driver name that is the same as a driver name received as part of the printer driver identifier, then selecting that particular printer driver without regard for whether that particular printer driver has a corresponding driver version that is the same as a driver version received as part of the printer driver identifier for installation on the server computer in order to enable the local printer to print.

34. A system as recited in claim 33, wherein the client computer transmits the printer driver identifier to the server computer.

35. A computer readable medium having computer executable instructions, which when executed by a processor, causes the processor to:

receive at a server a driver identifier for a printer that is attached to a client connected with the server, wherein the server can print information at the client;

use the driver identifier to select a closest matching driver of a plurality of drivers to install at the server, and not at the client; and install, at the server, the selected driver in order to enable applications that are executing to print to the printer using the installed driver.

36. The computer-readable medium of claim 35, wherein said applications run on the server.

37. The computer-readable medium of claim 35, wherein the driver identifier includes both a driver name and a driver version.

38. The computer-readable medium of claim 35, wherein the driver identifier is used to access a library at the server that stores the plurality of drivers.

39. The computer-readable medium of claim 35, wherein:
the driver identifier is used to check whether any of the plurality of drivers has a corresponding driver identifier that is the same as the received driver identifier; and
if a particular driver of the plurality of drivers has a corresponding driver identifier that is the same as the received driver identifier, then select that driver to install at the server.

40. The computer-readable medium of claim 35, wherein:
the driver identifier is used to check whether any of the plurality of drivers currently has a corresponding driver identifier that is different than the received driver identifier but that corresponds to the same driver as the received driver identifier; and
if a particular driver of the plurality of drivers currently has a corresponding driver identifier that is different than the received driver identifier but that corresponds to the same driver as the received driver identifier, then select that driver to install at the server.

* * * * *